United States Patent [19]
Ebersohl

[11] Patent Number: 5,413,411
[45] Date of Patent: May 9, 1995

[54] LOCAL NETWORK, IN PARTICULAR FOR A CONTROL AND SELF-MONITORING SYSTEM OF AN ELECTRICAL APPARATUS

[75] Inventor: Gérard Ebersohl, La Mulatiere, France

[73] Assignee: GEC Alsthom T&D SA, Paris, France

[21] Appl. No.: 73,059

[22] Filed: Jun. 8, 1993

[30] Foreign Application Priority Data

Jun. 9, 1992 [FR] France ............... 92 06921

[51] Int. Cl.⁶ ............................................ H04L 12/40
[52] U.S. Cl. ..................................... 370/85.1; 370/92; 340/825.52
[58] Field of Search ............... 370/85.1–85.3, 370/85.7, 85.9, 85.11, 85.6–85.7, 92, 94.1, 60; 340/825.5, 825.52, 310 A, 310 R

[56] References Cited

U.S. PATENT DOCUMENTS

| | | | |
|---|---|---|---|
| 3,912,872 | 10/1975 | Callens | 370/92 |
| 4,347,541 | 8/1982 | Cheu et al. | 361/50 |
| 4,928,097 | 5/1990 | Staab et al. | 370/85.11 |
| 4,991,171 | 2/1991 | Teraslinna et al. | 370/94.1 |
| 5,051,720 | 9/1991 | Kittirutsunetorn | 340/310 R |
| 5,132,967 | 7/1992 | Kalajainen | 370/85.1 |
| 5,172,373 | 12/1992 | Suzuki | 370/85.11 |

FOREIGN PATENT DOCUMENTS

0321203  6/1989  European Pat. Off.
2183376  6/1987  United Kingdom.

OTHER PUBLICATIONS

Patent Abstracts of Japan, vol. 11, No. 280 (E–539) Sep. 10, 1987 & JP-A-62 078 931 (NEC Corp.) Apr. 11, 1987.

*Primary Examiner*—Douglas W. Olms
*Assistant Examiner*—Chau T. Nguyen
*Attorney, Agent, or Firm*—Sughrue, Mion, Zinn, Macpeak & Seas

[57] ABSTRACT

A local network including no more than eight stations, each station being able to be both a source and a sink for data, and, thus being able both to receive and emit a message, the stations being interconnected by a serial bus and providing data to a distributed data base, which data is renewed cyclically under the control of a request generator that emits requests in the form of binary messages. The stations have addresses in the form of bytes respectively constituted by bytes of binary numbers representing powers of 2 in the range 0 to 7, a binary message emitted by the request generator containing the addresses, of all the stations designated to be sinks for the emitted binary message, in the form of a composite byte constituted by an OR UNION of the addresses of the stations designated to be sinks, a station thus observing that it is chosen as a sink by performing an AND INTERSECTION between the composite byte and the station's own address byte.

14 Claims, 4 Drawing Sheets

FIG. 1

| station N° | station address |
|---|---|
| 0 | 0 0 0 0 0 0 0 1 |
| 1 | 0 0 0 0 0 0 1 0 |
| 2 | 0 0 0 0 0 1 0 0 |
| ⋮ | ⋮ |
| 7 | 1 0 0 0 0 0 0 0 |

FIG. 2 a  0 1 1 1 1 0 0 0 b  0 0 0 1 0 0 0 0 c  0 0 0 1 0 0 0 0 d  0 1 1 1 1 0 0 0 e  0 0 0 0 0 1 0 0 f  0 0 0 0 0 0 0 0

LOCAL NETWORK, IN PARTICULAR FOR A CONTROL AND SELF-MONITORING SYSTEM OF AN ELECTRICAL APPARATUS

The present invention relates to a local network, usable in particular for the control and self-monitoring of a multipole electrical apparatus, such as a high tension electrical circuit breaker.

BACKGROUND OF THE INVENTION

In the patent application Ser. No. 08/073,045, now U.S. Pat. No. 5,384,678 filed on the same day as this application and entitled "A control and self-monitoring system, in particular for a multipole electrical apparatus such as a high tension circuit breaker", the Applicant describes a system in which each pole of the apparatus is associated with a microprocessor, the various microprocessors being connected to a serial bus under the control of a management member. (The disclosure of this copending application is expressly incorporated herein by reference.) The bus has other subscribers, such as members for measuring or checking various elements of the apparatus, such as the pressure of insulating gas or of oil used for hydraulic control.

In such a structure, in order to make it possible for the subscribers to perform their various action and monitoring tasks, each subscriber requires all or part of the information acquired or generated by the entire set of subscribers, and this applies in real time with synchronization that is as perfect as possible. This guarantees that at any given instant, the information shared between the subscribers does indeed have the same value for all of the subscribers. This constraint indicates that the local network must be capable of managing effectively and quickly a database which is distributed between the subscriber stations.

Remarkably, this concept is achieved by the FIP local network enabling a large number of stations to be interconnected. However, that local network has a very rich range of functions (e.g. bulletin board functions) thus requiring the frames that are interchanged to be relatively large in size, which has the drawback of giving rise to transmission efficiency that is too low for the applications envisaged in the present patent application. Furthermore, it requires a prior configuration operation to be performed on the software in each station when the network is switched on (tawing its power from an auxiliary voltage, in particular for the purpose of designating the data that the station is to produce or to consume. Together, these constraints make the FIP network ill-suited to the application envisaged by the Applicant, since relatively high refresh rates are required for a small number of data items, and the system must be capable of restarting quickly without supervision in the event of failures of the auxiliary power supplies or of the local network.

In any event, the number of subscribers on the bus is less than 8.

OBJECTS AND SUMMARY OF THE INVENTION

An object of the invention is to provide a local bus that is adapted to a small number of subscribers, that is capable of conveying information at an acceptable rate, and that enables data to be updated at a frequency that is suitable for the control and self-monitoring of circuit breakers in a high tension electricity station.

The present invention provides a local network comprising no more than eight stations constituting sources and/or sinks for data, the stations being interconnected by a serial bus and providing data to a distributed database, which data is renewed cyclically under the control of a request generator that emits requests in the form of binary messages, wherein the addresses of the sink stations are constituted by binary numbers representing powers of 2 in the range 0 to 7.

In a preferred embodiment, a binary message emitted by the request generator contains the addresses of all of the sink stations for the message in the form of a byte constituted by the OR UNION of the addresses of the corresponding sink stations, a station thus observing that it is a sink if it obtains a non-zero result by performing an AND INTERSECTION between said byte and its own address byte.

BRIEF DESCRIPTION OF THE DRAWINGS

Other features of the invention appear on reading the following description of an embodiment of the invention given with reference to the accompanying drawings, in which:

FIG. 1 shows the station addresses as sinks;

FIG. 2 shows two examples of implementing a search for sink stations;

MORE DETAILED DESCRIPTION

Figure 3:
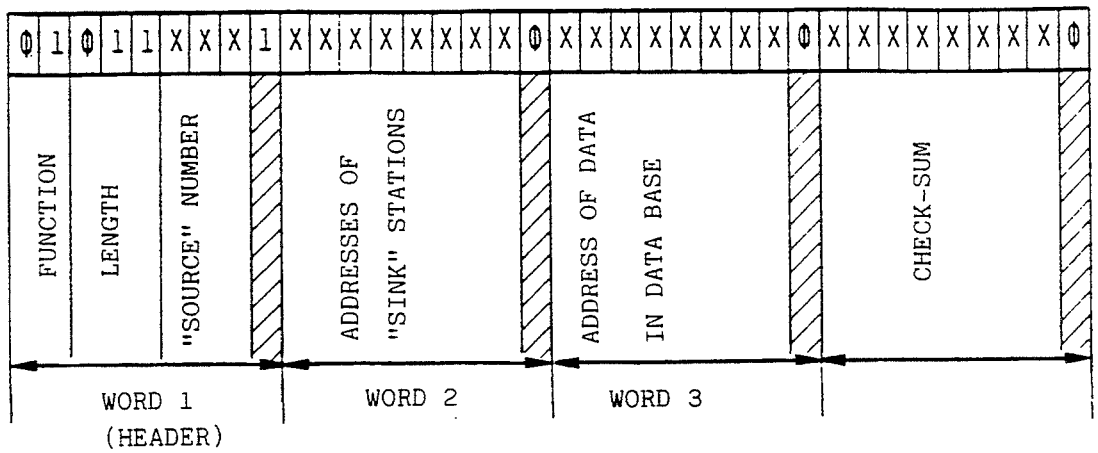
FIG. 3 shows the frame of a message as sent by the request generator.

Certain characteristics of a local network are outlined at this point.

A local network comprises subscribers or stations which are constituted by microprocessors or microcontrollers, and which are capable of receiving messages (these stations are called "sinks"), or of emitting messages (these stations are called "sources"), some stations may be both sources and sinks simultaneously, and others may be neither.

A local network includes a request generator which emits messages to the stations in a data sequence; the sink and source stations receive the request in full and make use of it as follows:

a source station responds to a request by emitting the specified data;

a sink station consumes the data emitted by the source station in response to the request.

Stations that are neither source nor sink ignore the requests. The information collected following such requests and the responses made to them are collected in a database used by a computer for controlling the industrial installation.

In the local network of the invention which comprises no more than eight numbered stations, messages come from a single source (either the request generator or a station) but may have up to seven sinks (the emitting station is not a sink for messages that it emits; the request generator is not a sink).

A first problem solved by the invention is identifying sink stations in simple manner. According to the invention, and as shown in FIG. 1, all of the sink stations are identified by a byte in which the address of any given sink station is constituted by a power of two from power zero to power seven.

Thus:

the address of station No. 0 is 2 to the power 0, i.e. 1 (binary 1);

the address of station No. 1 is 2 to the power 1, i.e. 2 (binary 10);

the address of station No. 2 is 2 to the power 2, i.e. 4 (binary 100); ...

the address of station No. 7 is 2 to the power 7, i.e. 128 (binary 10000000).

By performing the UNION operation using an OR circuit (or by the software equivalent) on the eight above addresses, a 1-byte word is built up in which all of the addresses are designated.

Thus, in accordance with the invention, the frame of any message emitted by the request generator includes a byte in which the addresses of all of the sink stations concerned by the message appear. Each station can then use an AND circuit (or its software equivalent) to perform a bit-by-bit INTERSECTION operation on said byte and the byte specifying its own address in order to determine whether it is concerned by the message.

In FIG. 2, byte a is an arbitrary example of a sink-identifying byte; byte b is the address of station No. 4; byte c is the bit-by-bit INTERSECTION of bytes a and b; it can be seen that this byte is identical to byte b which shows that station No. 4 is a sink for the forthcoming message.

Byte d is the same byte as byte a and represents the sink-identifier selected as an example; byte e is the address of station No. 2; byte f is the bit-by-bit INTERSECTION of bytes e and f; this byte comprises zeros only, thus showing that station No. 2 is not a sink for the forthcoming message.

Source stations can be identified by number, which requires only three bits for eight stations.

A second problem relating to implementing a network concerns the characteristics of the frame for messages emitted by the request generator; frame must be short so as to enable messages to be emitted at a high frequency; however it must also contain all of the data required for industrial operation of the network.

In particular, the message frame emitted by the request generator must indicate which station is to be the source, i.e. which station is to provide data, and which of the stations are to be sinks, i.e. which stations are to consume said data.

According to the invention, the message frame emitted by the request generator comprises four words each constituted by an 8-bit byte plus a 9th bit. Reference can be made to FIG. 3 in which x is a "don't care bit" that may be either binary 0 or binary 1. The words are built up as follows:

First word or header

The first two bits indicate the nature or the source of the message, for example a message coming from the request generator is identified by bits 01.

The next three bits indicate the number of bytes in the message sent, not including the header. In this case the number is 3, i.e. 011 in binary.

The next three bits indicate the number of the source station which is to emit data.

Following this first 8-bit byte, there is a 9th bit which is used in the "9th bit" protocol as used in products sold under the registered trademark INTEL, inter alia. When the 9th bit is a 1, all of the stations stop work in progress and listen to the remainder of the message.

Second word

The first eight bits are constituted by the UNION of sink station addresses, as described above with reference to FIG. 2. The 9th bit is zero.

All of the stations that are neither source nor sink, and that are therefore not concerned by the message, make use of the procedure known in INTEL terminology as SM2 to set a serial port interrupt flag to "1" and thus avoid being interrupted until a new header is sent.

Third word

The first eight bits specify the relative address in the data base where the information is to be stored.

The 9th bit is a zero.

Fourth word

The first eight bits are used to establish a check sum which is constituted, most simply, by the low order byte of the sum of the first three words. The 9th bit is a zero.

Figure 4:
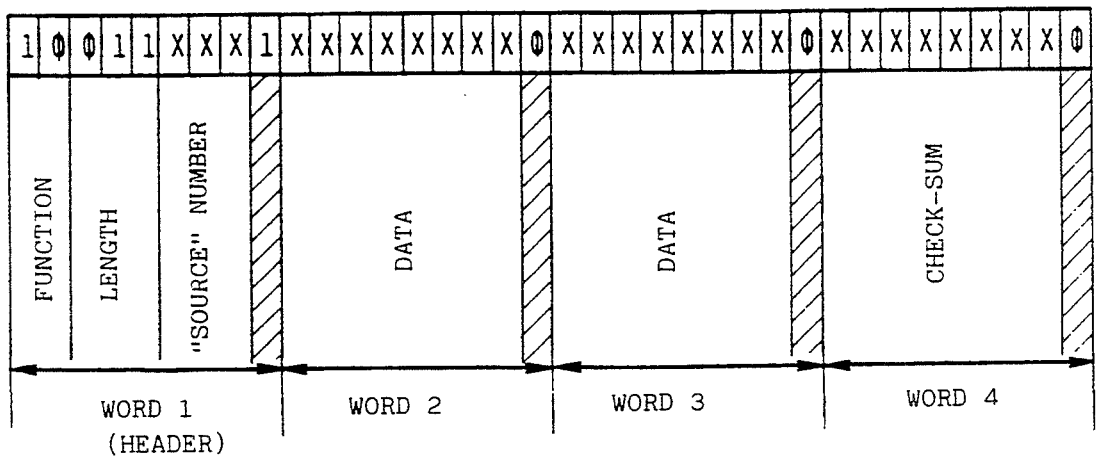
FIG. 4 shows the frame of the message sent by a source station in response to a request.

FIG. 4 shows the message frame emitted by a source station in response to the request from the request generator. Like the preceding frame, the message frame given in response comprises four words each comprising one 8-bit byte followed by a 9th bit.

First word

The first two bits serve to identify the message as a response to a request and to specify that a source is going to emit data. Sink stations that were identified by the message emitted by the request generator prepare themselves to consume information. For example these two bits may be 10.

The next three bits specify the number of bytes in the message, not including the header. In this case the number is 3, i.e. binary 011.

The next three bits give the number of the source station.

The 9th bit is a 1, so that the stations get ready to process the message.

Second and third words

These words constitute the item of data emitted by the source. All data emitted by any of the sources is in the format of two words each constituted by an 8-bit byte followed by a 9th bit of value zero. In this way, only the sink stations concerned by the data take account of these bytes and the following bytes.

Fourth word

The first eight bits are used to provide a check sum that can be constituted merely by the low order byte of the sum of the first three words, with the 9th bit being a zero.

The operation of the network is as follows, for a baud rate of 375 KB.

When issuing a request, the request generator opens a time window (monitoring period) of duration ds that may be equal to 600 microseconds, for example. As soon as the request generator has detected the response of the interrogated source, it emits a new request since the bus is then free. If everything takes place normally, the response arrives within 250 μs of the window being opened. If the generator does not detect the expected response, it waits until the end of the monitoring delay before emitting a new message. If the source has responded properly, the generator puts a 1 bit at the address of said source in a "source state" message which is sent to all of the stations after each complete refresh cycle of the database. This byte, for which all stations are sinks, is placed at the end of the database.

Figure 5:
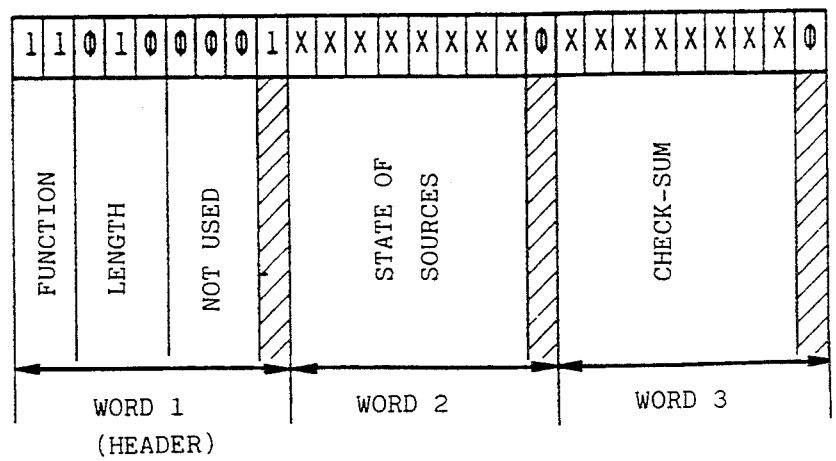
FIG. 5 shows the frame of a "source state" message sent by the request generator after each cycle.

The "source state" message is framed as shown in FIG. 5.

It comprises three words each of one 8-bit byte followed by a 9th bit.

First word or header

The first two bits are used to indicate the function of the message, and may be constituted by 11, for example.

Three other bits are used to indicate the number of bytes in the present message, not including the header. In this case the number is equal to 2, i.e. 10 in binary.

The following three bits have no meaning and are taken as being equal to 0.

The 9th bit is a 1.

Second word

This word describes the state of the sources, with a 1 at the address of each source if it is in good order and a 0 if it is faulty.

The 9th bit is a 0.

Third word

This word is constituted by the low order byte of the sum of the first two words for the purpose of constituting a simple check sum.

The 9th bit is a 0.

Figure 6:
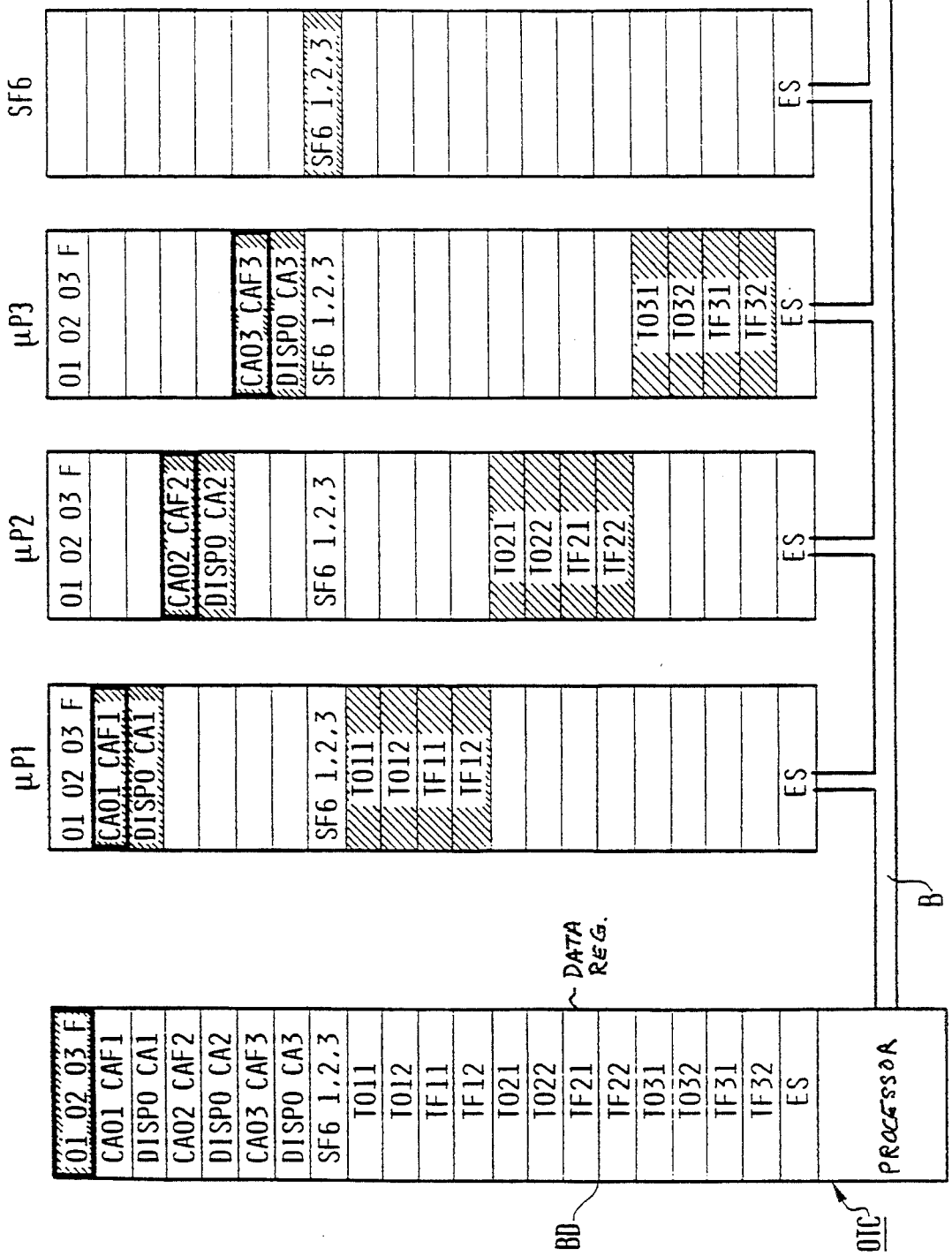
FIG. 6 is a diagram showing how the network of the invention is used for the control and self-monitoring of a three-pole electrical apparatus such as a high tension circuit breaker that is insulated by sulfur hexafluoride $SF_6$.

FIG. 6 shows an application of the network of the invention to the control and self-monitoring of a three-phase circuit breaker.

Each of the poles is associated with a microcontroller, the microcontrollers being referenced $\mu P1$, $\mu P2$, and $\mu P3$.

The poles are connected in a serial network by a bus B under the control of the request generator GR. The data is applied to a terminal of a processor member OTC that includes a data register BD that receives the data collected by the microcontrollers. Additional members such as a detector for detecting the pressure of insulating gas in the poles (referenced $SF_6$) may also be subscribers to the network.

In the diagram of FIG. 6, data for which various stations ($\mu P1$, $\mu P2$, $\mu P3$, $SF_6$) are sources is marked by shading. Priority data is distinguished from non-priority by being surrounded in heavy lines.

The data given in non-shaded rectangles is data for which the various stations are sinks. Rectangles that remain empty correspond to data not consumed by the station in question.

The data characteristic of circuit breaker operation is as follows.

Priority data

O1, O2, O3, and F designate opening and closing orders for the poles, where station OTC is the source and stations $\mu P1$, $\mu P2$, and $\mu P3$ are the sinks.

CAO1 and CAF1 are data provided by opened and closed auxiliary contacts for pole 1, respectively indicating that pole 1 has changed from the closed state to the open state, and that it has changed from the open state to the closed state. $\mu P1$ is the source of this data, OTC is the sink.

DISPO CA1 represents the availability state of the auxiliary signal contacts; this data item is generated by $\mu P1$ on the basis of self-monitoring devices attached to the auxiliary contacts; OTC is the sink for this data.

CAO2 and CAF2 and DISPO CA2 are corresponding data where $\mu P2$ is the source and OTC the sink.

CAO3 and CAF3 and DISPO CA3 are corresponding data where $\mu P3$ is the source and OTC is the sink.

Non-priority data

TO11 and TO12 are time durations relating to the opening of pole 1; TO11 is the time that elapses between the opening order being given and the moment when the auxiliary opened contact detects the change in position of the moving equipment of the circuit breaker; TO12 is the time that elapses between the movement when the auxiliary opened contact observes motion of the moving equipment and the moment when the closed contact observes the end of said movement. TF11 and TF12 are analogous durations measured during a pole closure operation. $\mu P1$ is the source for these four data items and OTC is the sink.

TO21, TO22, TF21, and TF22 are analogous, with $\mu P2$ being the source and OTC the sink.

TO31, TO32, TF31, and TF32 are analogous, with $\mu P3$ being the source and OTC the sink.

$SF_6$ 1, 2, 3 is a data item relating to the pressure of the insulating gas within the interrupting chambers of the poles. This data is emitted by the member $SF_6$ and is consumed by OTC, $\mu P1$, $\mu P2$, and $\mu P3$.

The source state message ES is emitted by the request manager and is consumed by all of the stations.

In a particular embodiment of the network of the invention applied to the control and self-monitoring of a three-phase circuit breaker, priority data may be "refreshed" in the database BD once every 2.5 milliseconds, for example, while non-priority data may be refreshed only once every 50 milliseconds.

Under some circumstances, the source state message makes it possible to adopt a fallback strategy.

For example, if an opening order O2 is sent to the microprocessor $\mu P2$, but the microprocessor observes that the station $SF_6$ is faulty, then the program in $\mu P2$ may prevent the pole being opened in spite of the order given, for the purpose of avoiding possible destruction of the interrupting chamber; the grid will have to be protected by protection means provided further upstream.

It may be observed that, in a network of the kind described above, all of the microcontrollers may be paired with an associated microcontroller in order to provide safety redundancy.

Thus, microprocessor $\mu P1$ may be associated with a microcontroller $\mu P1^*$ having the same address as $\mu P1$ and which is on standby; software prevents $\mu P1^*$ from emitting; however, if $\mu P1^*$ observes from the station state message ES that $\mu P1$ is faulty, then $\mu P1^*$ is enabled for emission and it takes over from $\mu P1$.

The microprocessors ($\mu P1$, $\mu P2$, $\mu P3$, OTC, $SF_6$) may advantageously be of INTEL type 80C31, together with an interface of type PSD 301-20L.

It may be observed that in order to make the network operate more quickly, all of the messages may be prepared in advance and stored in the memories of the request generator. These messages describe all source and sink configurations in a complete data refresh cycle, and as a result there is no need to perform a prior operation of configuring stations before starting the local network.

It may be observed that the network of the invention is open and that it can receive additional stations without difficulty, e.g. a station that provides data concerning the pressure of hydraulic control fluid.

The invention is applicable to any basic local network having no more than eight subscribers. If the number eight should be exceeded, it will be understood that the overall network may be organized as sub-networks interconnected by gateways.

Furthermore, the system of the invention may make use of conventional means such as "open collector" gates to enable the physical connection of the stations to the bus proper to be provided by the so-called "wired-OR" technique. This is made possible since messages are transmitted in asynchronous mode by associating each byte with a "start bit" and with a "stop bit". As a result, when transmitters are in the inactive state, the bus is at logic level 1 because of pull-up resistors connecting it to the +5 V potential, and while all inactive emitters are in a high impedance state.

Given the way the network is managed by the request generator, only one emitter takes control of the network after a request has been issued. Collisions are therefore not possible on such a network.

Should a collision occur accidentally, then the corresponding frames would be rejected by the receivers because of the check sum facility.

Naturally, means are implemented to enable stations to be located remotely, by means of optical fibers. This applies in particular to the OTC station.

It may be observed that the "9th bit" procedure mentioned above constitutes means that are helpful in obtaining synchronization of the frames; a station can therefore be connected without difficulty.

Finally, it may be observed that the microcontrollers associated with the stations can in most cases provide not only performance of the transmission protocol described above, but also application software associated with the electricity station in which the controlled electrical apparatus is located. This facility provided by the microcontrollers makes it possible to greatly reduce the installation and maintenance costs of electricity stations fitted with microcontrollers that are interconnected by the network of the invention.

I claim:

1. A local network comprising no more than eight stations, each station being able to be both a source and a sink for data, and, thus being able both to receive and emit a message, the stations being interconnected by a serial bus and providing data to a distributed data base, which data is renewed cyclically under the control of a request generator that emits requests in the form of binary messages, wherein the stations have addresses in the form of bytes respectively constituted by bytes of binary numbers representing powers of 2 in the range 0 to 7, a binary message emitted by the request generator containing the addresses, of all the stations designated to be sinks for said emitted binary message, in the form of a composite byte constituted by an OR UNION of the addresses of said stations designated to be sinks, a station thus observing that it is chosen as a sink by performing an AND INTERSECTION between said composite byte and the station's own address byte.

2. A local network according to claim 1, wherein said binary message emitted by the request generator comprises four words, each constituted by an 8-bit byte plus a 9th bit.

3. A local network according to claim 2, wherein a first one of said words is a header byte having two bits indicating that the origin of the emitted binary message is the request generator, three bits indicating number of bytes in the emitted binary message, not including the header, and three bits indicating the addresses of stations designated by the emitted binary message to be data source stations.

4. A local network according to claim 3, wherein the 9th bit of the first word is a 1, thereby informing the stations that they have to listen.

5. A local network according to claim 2, wherein the second word comprises an 8-bit byte constituted by the OR UNION of the sink station addresses for the data that is to be provided by the station which is designated as being the source.

6. A local network according to claim 2, wherein the third word of the message includes the address in the database of the data indicated by the message.

7. A local network according to claim 1, wherein the message emitted by a source station in response to a message emitted by the request generator comprises four words each constituted by an 8-bit byte plus a 9th bit.

8. A local network according to claim 7, wherein a first one of said words is a header byte that comprises two bits identifying the nature of the message, three bits indicating the number of bytes in the message, not including the header, and three bits giving the number of the source station emitting the message.

9. A local network according to claim 7, wherein the second and third words are constituted by the data emitted by the source station.

10. A local network according to claim 1, wherein the request generator periodically addresses a query message to all the stations asking them to answer as a proof they are not out of order, said request generator periodically emitting a message, called state of sources, indicating which stations are out of order.

11. A local network according to claim 10, wherein said message, called state of sources, comprises an 8-bit byte constituted by binary "1" at the address of each source having answered the query message, and by a binary "0" at the address of each source having not answered.

12. A local network according to claim 1, applied to the control and self-monitoring of a multipole polyphase circuit breaker placed in an electricity station, wherein the stations are constituted by microprocessors respectively associated with each of three poles of the circuit breaker, by microprocessors associated with monitoring parameters relating to the operation of the circuit breaker, and by a processor member for providing processed data.

13. A local network according to claim 12, wherein opened and closed positions of auxiliary contacts of the circuit breaker provide signals containing information of whether the poles are opened or closed, wherein the circuit breaker provides indications of the time durations of an opening or closing operation of the poles, and wherein data provided by the pole microprocessors comprise the information provided by the opened and closed auxiliary contacts, and by the time durations required for opening and for closing of the poles.

14. A local network according to claim 13, wherein the data provided by the processor member is constituted by opening orders and by a closing order applicable to the poles and addressed to the microprocessors of the poles.

* * * * *